UNITED STATES PATENT OFFICE.

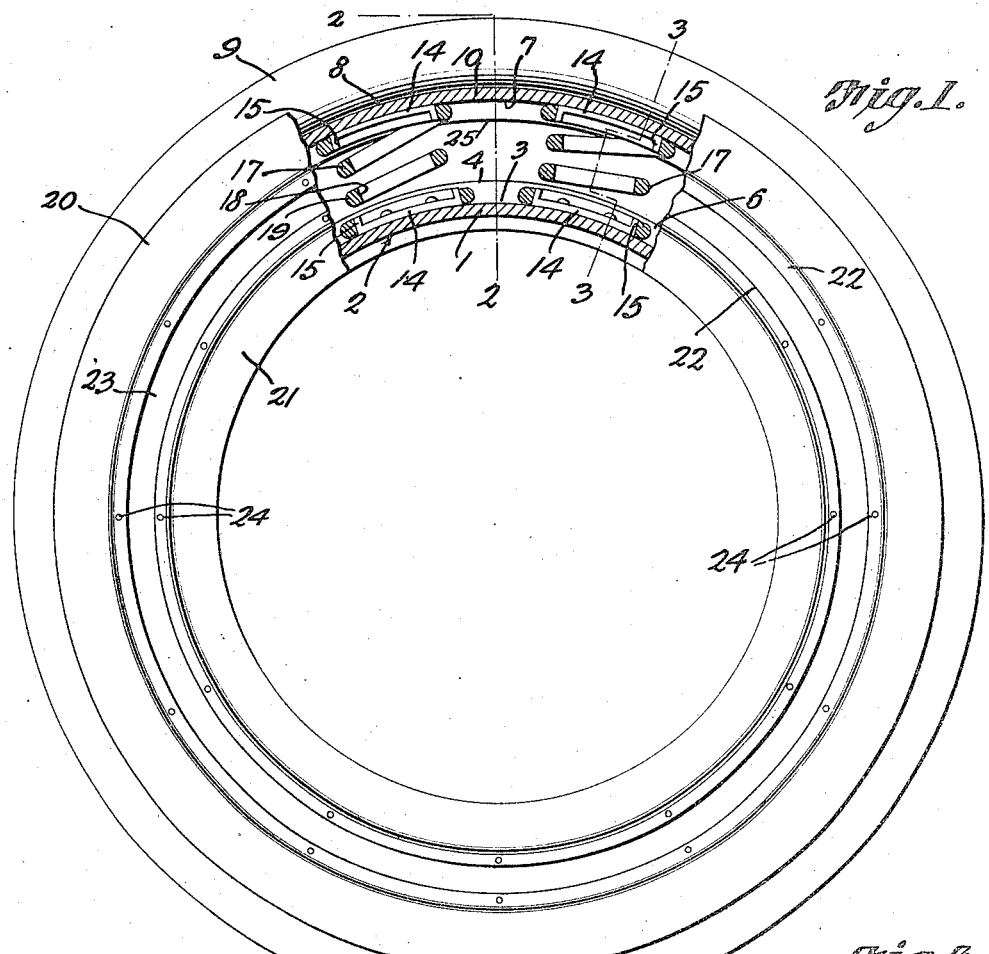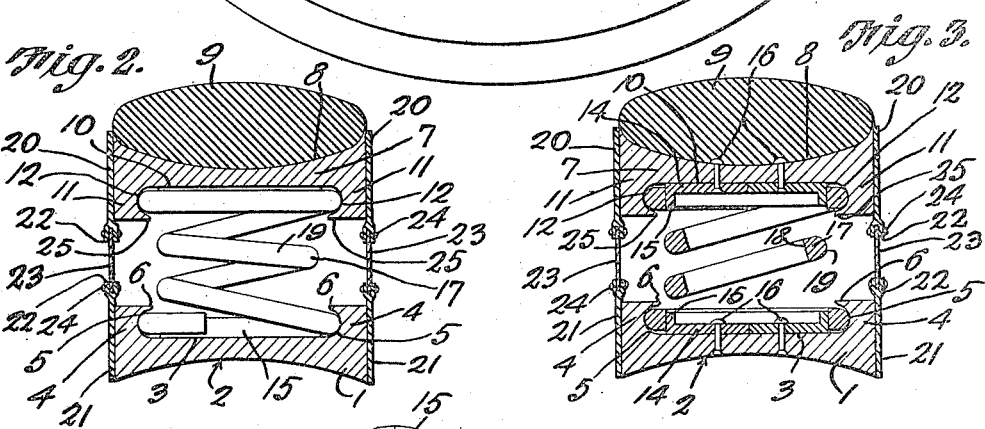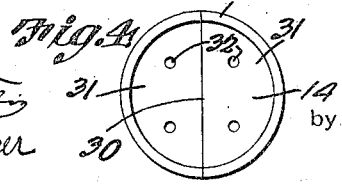

HENRY M. HORNE, OF SULPHUR SPRINGS, TEXAS, ASSIGNOR OF FIFTY ONE-HUNDREDTHS TO JOHN C. BUFORD, OF SULPHUR SPRINGS, TEXAS.

VEHICLE-TIRE.

1,240,793.

Specification of Letters Patent.

Patented Sept. 18, 1917.

Application filed November 18, 1916. Serial No. 132,116.

*To all whom it may concern:*

Be it known that I, HENRY M. HORNE, a citizen of the United States, residing at Sulphur Springs, in the county of Hopkins and State of Texas, have invented a new and useful Vehicle-Tire, of which the following is a specification.

The device forming the subject matter of this application is a vehicle tire, and one object of the invention is to provide, in a device of this type, novel means whereby the sustaining springs which are interposed between the inner rim and the outer rim, are connected with the said rims, in such a way that, without the use of bolts or other connecting elements, the inner rim will be suspended from the outer rim.

Another object of the invention is to provide novel means whereby, in combination with sustaining springs, an air cushion between the rims may be provided.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a vehicle tire constructed in accordance with the present invention, parts being broken away;

Fig. 2 is a cross section on the line 2—2 of Fig. 1; and

Fig. 3 is a cross section on the line 3—3 of Fig. 1.

Fig. 4 is a plan showing one of the retainers.

In carrying out the present invention there is provided an inner rim 1, concaved transversely upon its under face, as shown at 2. In the outer face of the inner rim 1 there is fashioned a circumscribing groove 3 defining side ribs 4. The lateral walls of the groove 3 are outwardly concaved as shown at 5, to form undercut seats in the inner edges of the side ribs 4, and to define overhanging flanges 6.

The numeral 7 indicates an outer rim which is transversely concaved on its outer face, as shown at 8, to receive a tire 9. The tire 9 may be of any desired form. In the inner face of the outer rim 7 there is fashioned a circumscribing groove 10 defining side ribs 11. The lateral walls of the groove 10 are outwardly concaved as shown at 12, to form undercut seats located in the inner faces of the ribs 11, and to define overhanging flanges 25.

Retainers are mounted in the groove 10 of the rim 7, and in the groove 3 of the rim 1. The retainers are of circular outline and preferably are of cup shape, each retainer comprising a base 14 and a marginal flange 15. The retainers are secured to the respective rims by means of attaching elements 16.

The invention comprises any desired number of helical springs 17, the terminal convolutions of which are engaged between the flanges 15 of the respective retainers and the ribs 11 and 4. The material out of which the springs 17 are made preferably is of irregular cross section, comprising a flat side 18 engaged with the flange 15 of the retainer, and a curved side 19 which coöperates with the outwardly concaved seats 5 and 12 in the ribs 4 and 11 respectively. Owing to the construction above described, and because the terminal convolutions of the springs 17 are overhung by the flanges 6 and 25, the inner rim 1 is suspended from the outer rim 7 in a secure manner. The springs 17 are compressed to a considerable extent before they are mounted in place. It is to be observed that the outer or terminal convolutions of the springs 17 are of a somewhat greater diameter than are the intermediate convolutions of the springs. Owing to this construction, the intermediate portions of the springs may yield without engaging any portion of either the inner rim 1 or the outer rim 7, and thus undue friction and a crystallization of the springs is avoided. The springs 17 preferably comprise but few convolutions, four convolutions only being shown, although this number may be increased or decreased at will.

Since the springs are comparatively short, there is a minimum amount of lateral play between the inner rim 1 and the outer rim 7.

Side rings 20 are brazed or otherwise secured to the outer edges of the rim 7, and side rings 21 are brazed or otherwise secured to the outer edges of the inner rim 1. It is desirable, in any event, that air-tight joints between the rings 20 and 21 and the respective rims be provided. The adjacent edges of the rings 20 and 21 are bifurcated to form lips 22 between which are received the edges of a flexible annular strip 23, which may be made out of rubber, leather or like substance. Securing elements 24 unite the lips of the respective rings and pass through the strip 23, air-tight joints being afforded in this manner.

Owing to the construction last above described, an air-tight space between the rims 1 and 7 is afforded, and the air thus imprisoned between the rims acts as a cushion which, coöperating with the springs 17, probably gives the structure added resiliency to some extent.

As shown in Fig. 4 the retainers may be divided along a line 30 to form separate parts 31 having openings 32 which receive the securing elements 16. The heads of the securing elements 16 project beyond the outer rim 7 and engage the tire 9 to prevent the same from creeping.

Having thus described the invention, what is claimed is:—

In a vehicle tire, an inner rim having overhanging flanges; an outer rim having overhanging flanges; helical springs abutting terminally against the rims and having terminal convolutions engaged beneath the flanges, the terminal convolutions abutting laterally against the rims beneath the flanges and projecting toward the median plane of the tire beyond the flanges; retainers on the rims and engaging the inner edges of the terminal convolutions of the springs in spaced relation to the flanges; and means for securing the retainers to the respective rims.

In testimony that I claim the foregoing as my own, I have hereto affixed my signature in the presence of two witnesses.

HENRY M. HORNE.

Witnesses:
MASON B. LAWTON,
IVY E. SIMPSON.

Copies of this patent may be obtained for five cents each, by addressing the "Commissioner of Patents, Washington, D. C."